Dec. 26, 1944. H. K. HERRICK ET AL 2,365,819
TRUCK SUPPORT FOR HEAVY TRAVELING MACHINES
Filed Nov. 27, 1942  3 Sheets-Sheet 3
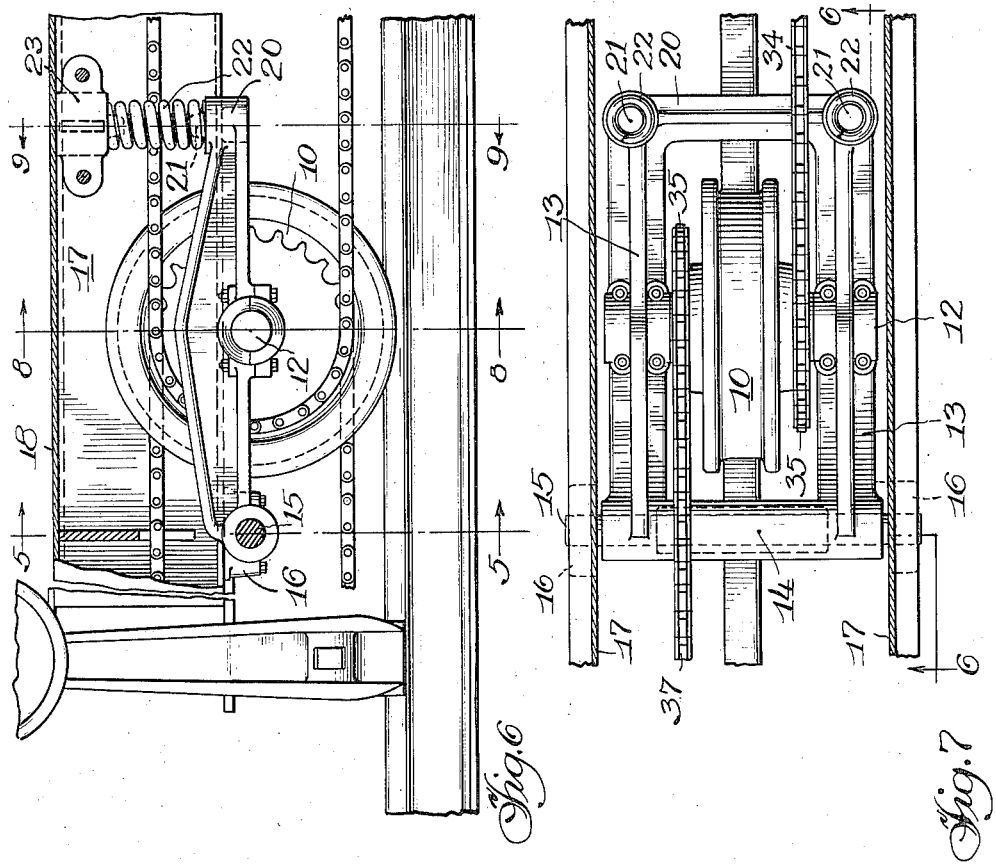
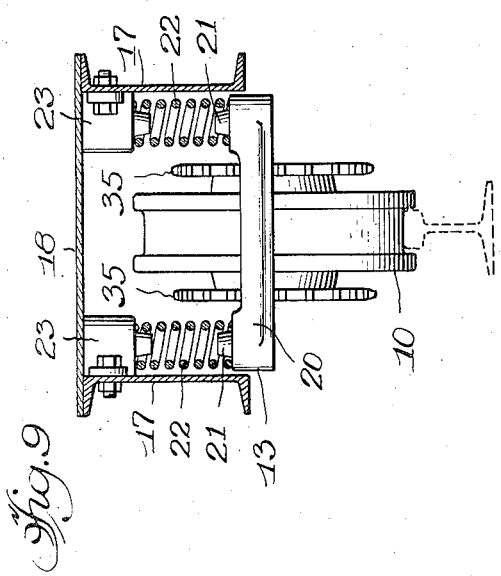
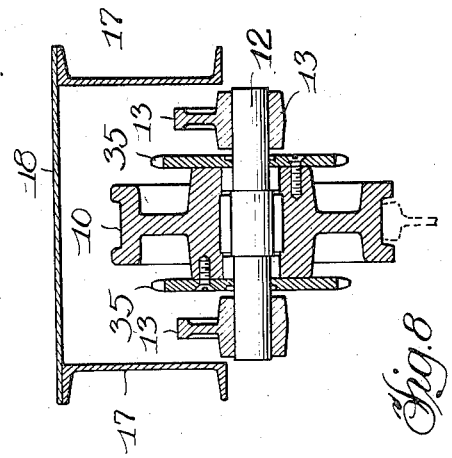
INVENTORS.
Homer K. Herrick
and Charles J. Horn
By Mann, Brown Attys.

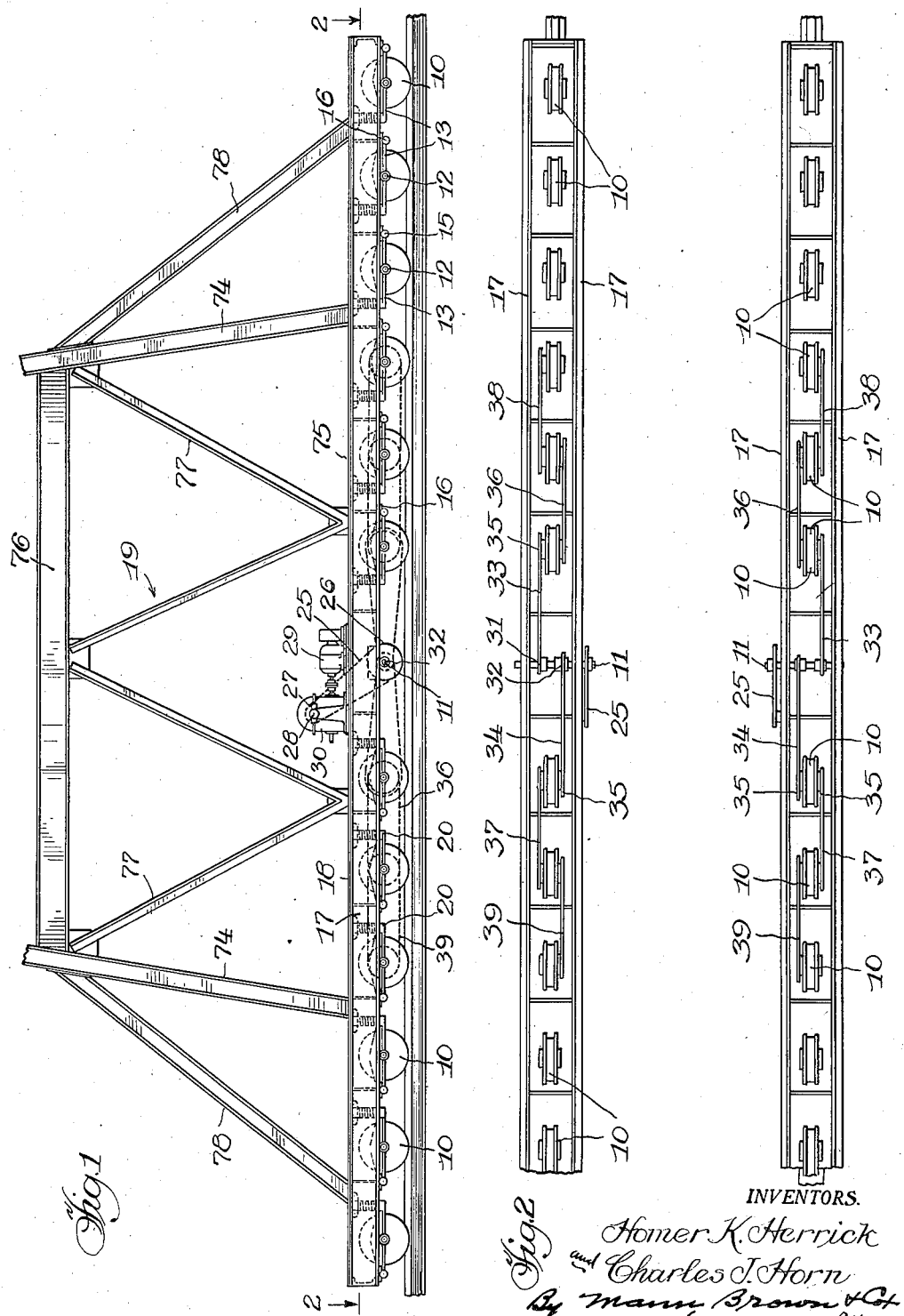

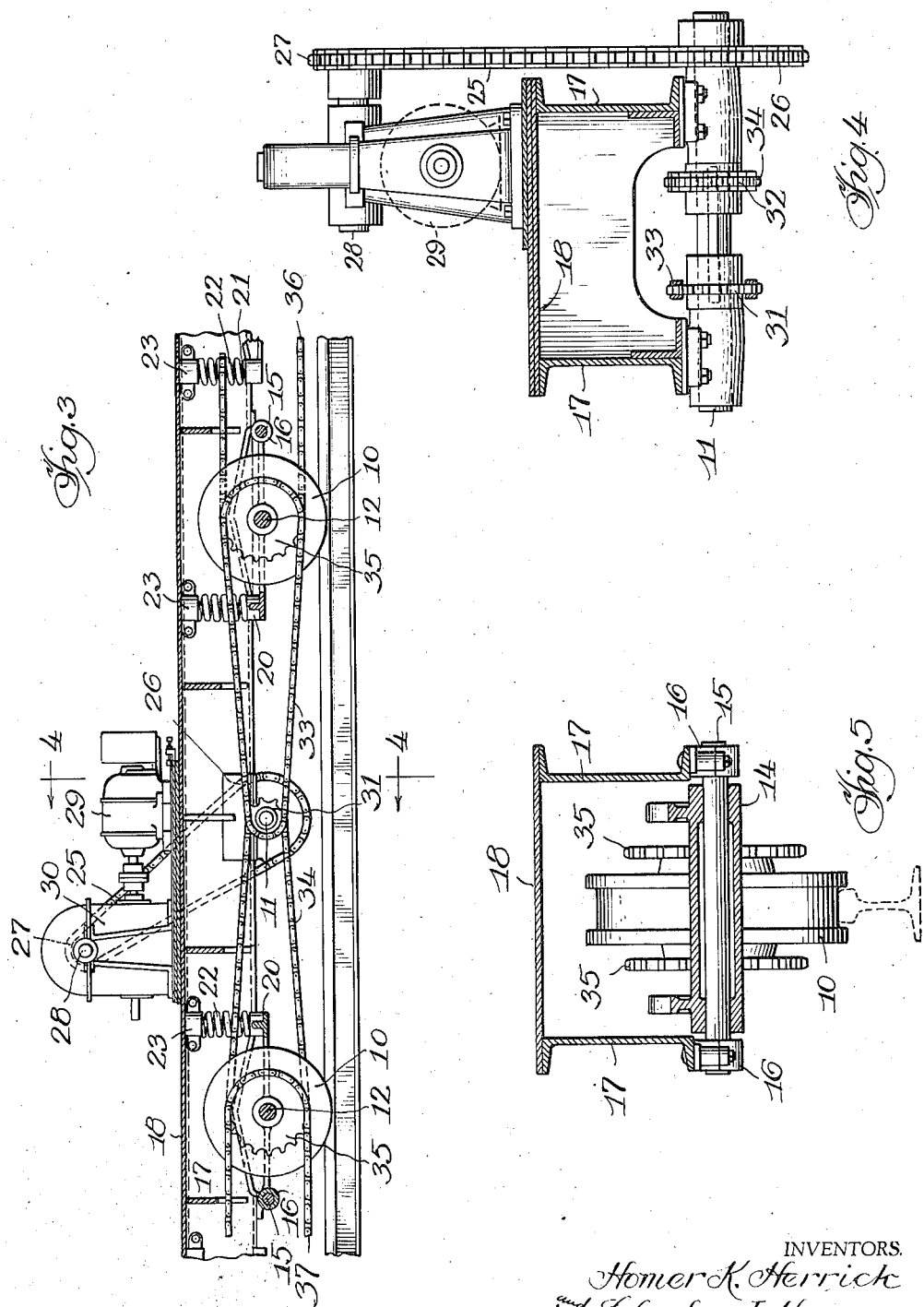

Patented Dec. 26, 1944

2,365,819

UNITED STATES PATENT OFFICE 2,365,819

TRUCK SUPPORT FOR HEAVY TRAVELING MACHINES

Homer K. Herrick, South Pasadena, and Charles J. Horn, Arcadia, Calif., assignors to Stephens-Adamson Mfg. Co., a corporation of Illinois Application November 27, 1942, Serial No. 467,129

7 Claims. (Cl. 105—180)

Great traveling machines, such as are used for loading and unloading ships, impose enormous loads upon the tracks of piers and wharves, which, in the nature of things, are often rough and uneven. Hence, the tracks for carrying these machines must accommodate the unevenness of the track and equalize the load on the several wheels, otherwise, a wheel upon mounting a high spot in the track would assume an undue proportion of the load and thereby concentrate the stress on the high spot, the axle and the related portion of the machine frame. Heretofore, the equalizing has been achieved by compound truck structures including a plurality of simple trucks and beams which received the load of the machine at two "points" and delivered it to a multiplicity of wheels on the track. These truck structures are heavy and costly and, supporting the machine frame or tower at two points on a side, made heavy and costly frame structures unavoidable.

The principle object of this invention is to provide a simple, cheap, equalizing truck structure that will give well distributed support at numerous points and thus permit the use of comparatively light and economical frame structure for those great machines. Generally speaking, this is accomplished in the specific form disclosed by mounting each side of the tower or frame on a large number of track wheels, each of which independently supports its part of the load on a beam, one end of which is fulcrumed beneath the base of the tower or frame and the other end of which has a spring between it and the base of the tower or frame so that each wheel gives the tower two points of support and may adjust itself to any inequalities in the track and prevent concentration of the load and hence of the stress at any one place.

A machine of the type referred to is disclosed in the copending applications Serial Nos. 467,128 and 467,130 filed of even date herewith and the disclosures therein are incorporated in this specification by this reference.

In the drawings showing a preferred embodiment of the invention,

Fig. 1 is a side elevation of one embodiment of the truck structure and the lower portion of a frame or tower of the machine;

Fig. 2 is an inverted plan view of the two sills of the frame or tower with their supporting wheels and driving mechanism;

Fig. 3 is an enlarged longitudinal section of the intermediate portion of the truck structure with the power plant for driving it shown in side elevation;

Fig. 4 is a vertical section on the line 4—4 of Fig. 3, looking in the direction of the little arrows;

Fig. 5 is a vertical section through the fulcrum for one of the wheel supported levers taken on the line 5—5 on Fig. 6;

Fig. 6 is an enlarged fragment of a truck structure showing one of the supporting wheels and its associated lever;

Fig. 7 is a plan view, partly in section, corresponding to Fig. 6;

Fig. 8 is a transverse section through the axis of one of the supporting wheels taken on the line 8—8 of Fig. 6; and Fig. 9 is a transverse section adjacent to the spring end of one of the levers associated with the supporting wheel and is taken in the plane indicated by line 9—9 of Fig. 6.

But these specific illustrations and the corresponding description are used for the purpose of disclosure only and are not intended to impose unnecessary limitations on the claims.

Referring to Fig. 1, the embodiment here illustrated includes twelve track wheels 10 arranged in groups of six each, spaced on opposite sides of the jack shaft 11 from which a group of three of the wheels at each side is driven.

Referring to Figs. 5, 6, 7, 8 and 9, it will be seen that as each wheel is journalled on a shaft 12 which supports a box beam comprising side pieces 13 connected at one end by a tubular bar 14, through which passes the fulcrum shaft or pin 15, the opposite ends of which are secured by pillow blocks 16 to the bottom flanges of fifteen inch channels 17 spaced apart and secured at their upper flanges to a plate 18, 2 feet, 7¾ inches wide and running the length of the channels which together form the side sills of the tower or frame generally indicated by 19. The ends of the side arms 13 opposite to the fulcrum are connected by a transverse bar 20 and at the corners there are spring seats 21 which support spiral springs 22 at their lower ends while their upper ends support the spring seats 23 secured to the channels 17 of the sills. The opposite ends of the shaft 12 are made fast to the mid portion of the arms 13 by pillow blocks, as is best shown in Fig. 6.

From this arrangement, as shown in Figs. 5, 6, 7, 8 and 9, it will be clear that the supporting wheels and associated levers and springs are within the compass of the sills of the frame and the accommodation to unevennesses in the track takes place without extending beyond the sides of the sill.

The jack shaft 11, Figs. 1 to 3, inclusive, is driven by a chain 25 and two sprockets 26 and 27 from a shaft 28 which receives power from a motor 29 through suitable reduction gearing indicated at 30.

The shaft 11 has two sprockets 31 and 32 from which chains 33 and 34 drive sprockets 35 associated with the two adjacent wheels 10. From these two wheels, other chains 36 and 37 drive the next adjacent wheels 10 and these in turn drive the next adjacent wheels through chains 38 and 39, all arranged as shown in the plan view, Fig. 2. This makes a very simple drive for six out of the twelve wheels which has been found sufficient in a satisfactory installation under the great tower of a marine leg apparatus for unloading sugar. The chains 38 and 39 have the lightest driving strain, the chains 36 and 37 the next greater, and the chains 33 and 34 the greatest between the jack shaft and the two sets of wheels.

This arrangement provides the desired equalization and accommodation in supporting the great weight on the tracks along the pier or wharf. Some engineers, however, will wish to have special means for clamping the apparatus to the track or braking it and restricting any yielding motion under pulsating wind pressure or earthquake shocks to suitable limits. This may be accomplished by special yielding holding brakes, one of which is shown at the left hand side of Fig. 6. One of such brakes may be provided at each end of each of the sills, or one at each of the four corners of the supporting frame. Such brakes form no part of the invention claimed in this application.

The tower frame is preferably fabricated of structural steel and will take any suitable form within the choice and preference of structural engineers. As here shown, each side of the frame includes posts or upright struts 74 rising from the sills generally indicated as 75 and connected by a cross strut 76. Between these are braces 77 and between the ends of the sills and the struts 74 are braces 78. This general arrangement of framing is made possible by the wide distribution of the load from the sills to the wheels, first through 24 "points" corresponding to the opposite ends of the wheel beams and then to the twelve wheels. There being no possibility of concentrating the strain in any particular place, the framework can be proportionately light and there will be no danger of reversals of stress.

We claim:

1. In a device of the class described, a tower frame having side sills, a multiplicity of independent, like wheel supports for each side sill, each including a lever fulcrumed at one end to the adjacent side sill, a spring between the other end and the adjacent side sill, and a supporting wheel between the fulcrum and the spring.

2. In a device of the class described, a tower frame having side sills, a multiplicity of independent, like wheel supports for each side sill, each including a lever fulcrumed at one end to the adjacent side sill, a spring between the other end and the adjacent side sill, a supporting wheel between the fulcrum and the spring, a drive shaft between two adjacent wheel supports, a drive from the drive shaft to each adjacent wheel, and a drive from each adjacent wheel to the next adjacent.

3. In a device of the class described, a tower frame having a box beam side sill, a rectangular lever fulcrumed at one end on a shaft between the vertical webs of said sill, spaced springs between the other end of the lever and the top plate of said sill, and a supporting wheel journaled on a shaft crosswise to the lever and midway between the fulcrum and the springs.

4. In a device of the class described, a tower frame having hollow side sills open at the bottom, a multiplicity of independent, like wheel supports for the frame, each including a lever fulcrumed at one of its ends on a side sill, a spring between the other end of the lever and the side sill, and a supporting wheel journaled on the lever between the fulcrum and the spring and projecting downwardly from the hollow of the side sill, all of the wheels at one side of the frame being aligned to run along a supporting rail and extending substantially from end to end of the sill at said side.

5. In a device of the class described, a tower frame having hollow side sills open at the bottom, a multiplicity of independent, like wheel supports for the frame, each including a lever fulcrumed at one of its ends on a side sill, a spring between the other end of the lever and the side sill, a supporting wheel journaled on the lever between the fulcrum and the spring and projecting downwardly from the hollow of the side sill, a drive shaft between two adjacent wheel supports having a driving sprocket in the hollow of the side sill, other sprockets in the hollow of the side sill associated with the adjacent wheels and with the next adjacent, and drive chains cooperating with said sprockets.

6. In a device of the class described, a tower frame having a base including a plurality of members cooperating to support the weight of the tower frame, a multiplicity of independent, like wheel supports for each of said members, each including a lever fulcrumed at one end on said member, and a multiplicity of supporting wheels cooperating to distribute the load transmitted by each member, one of said wheels being mounted between the fulcrum and the spring of each wheel support.

7. In a device of the class described, a tower frame having a base including a plurality of members cooperating to support the weight of the tower frame, a multiplicity of independent, like wheel supports for each of said members, each including a lever fulcrumed at one end on said member, a multiplicity of supporting wheels cooperating to distribute the load transmitted by each member, one of said wheels being mounted between the fulcrum and the spring of each wheel support, a drive shaft between two adjacent wheel supports, a drive from the shaft to each adjacent wheel, and a drive from each adjacent wheel to the next adjacent.

HOMER K. HERRICK.
CHARLES J. HORN.